United States Patent Office 3,542,837
Patented Nov. 24, 1970

3,542,837
METHOD OF PREPARING TRIORGANOSILANOLS
Terence J. Swihart, Essexville, Mich., assignor to Dow Corning Corporation, Midland, Mich., a corporation of Michigan
No Drawing. Filed Oct. 17, 1968, Ser. No. 768,493
Int. Cl. C07f 7/08
U.S. Cl. 260—448.2
5 Claims

ABSTRACT OF THE DISCLOSURE

Triorganosilanols are prepared by hydrolyzing a mixture of a triorganochlorosilane and hexa-organodisilazane in an aqueous medium having a pH of between 6 and 9. This process gives an excellent yield of silanol of high purity and having good storage stability.

---

Past commercial attempts to prepare triorganosilanols of the type defined below have been relatively unsuccessful. This has been due to the fact that if one attempts to hydrolyze the chlorosilanes directly, even in the presence of hydrogen halide acceptor, one finds that the yield of triorganosilanol is relatively low due to condensation to the hexa-organodisiloxane. This seems to occur because the acid produced by the hydrolysis condenses the silanol in spite of the presence of the alkali. This may have something to do with the relative rates of reaction of the acid with the silanol and with the alkali, or it may have to do with the fact that mixing conditions required to obtain immediate neutralization of the acid are so critical that successful operation is not obtained.

One can, of course, obtain reasonable yields of triorganosilanols by hydrolyzing alkoxysilanes under neutral conditions. However, this process is extremely slow and not feasible commercially due to the poor volume efficiency.

It is the object of this invention to provide a commercially feasible method of preparing the herein defined triorganosilanols in high yields with a high degree of purity and to make such materials which are stable on storage.

This invention relates to a method of producing silanols of the formula $R_3SiOH$ which comprises (1) adding a mixture of

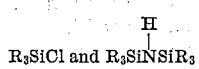

in the molar ratio of from .75:1 to 1:1 to water containing dissolved therein, a salt of an alkali metal or an ammonium salt in amount to impart a pH of between 6 to 9 to the aqueous phase, the reaction mixture being thoroughly agitated during addition of the reactants and (2) thereafter separating the so-produced $R_3SiOH$ from the aqueous phase, in said compounds R being of the group consisting of aliphatic hydrocarbon radicals of from 1 to 3 carbon atoms, the phenyl radical and the $CF_3CH_2CH_2—$ radical, there being on the average of no more than one phenyl or trifluoropropyl radical per silicon atom.

The hydrolysis of the combination of the triorganochlorosilane and the disilazane and the use of the defined salts results in a buffering action during hydrolysis, which prevents a drastic shift in pH and thereby reduces or eliminates the condensation of the silanols to the corresponding disiloxanes. For the purpose of this invention it is critical that the molar ratio of chlorosilanes to silazanes be within the range specified above. It is also critical that the pH of the aqueous phase be in the specified range. This is accomplished by employing a sufficient amount of an alkali metal salt or an amonium salt which is either alkaline or slightly acid in nature. Any of the above salts which will maintain the pH in this range are operative in this invention. Specific examples of such salts are sodium bicarbonate, sodium acetate, ammonium acetate, ammonium carbonate, potassium bicarbonate, lithium benzoate and caesium acetate.

It is extremely important that during the addition of chlorosilane and silazane to the aqueous hydrolysis medium thorough agitation be obtained at all times. If this is not true the yield of the desired silanol is reduced.

The mixture of silane and silazane hydrolyzes rapidly at room-temperature with some exotherm and therefore the preferred operation is carried out by merely adding a mixture of chlorosilane and silazane to the aqueous phase at room-temperature. The reaction rate is sufficiently fast that hydrolysis is essentially complete by the time the addition of the hydrolyzable mixture has been completed.

The amount of water employed is not critical, although obviously sufficient water should be employed to hydrolyze all of the chlorosilane and silazane. It is advantageous, of course, to have enough water present to prevent the precipitation of ammonium chloride, which is formed that the reaction of the HCl and ammonia produced by the hydrolysis of the chlorosilane and silazane respectively. However, if desired, one can simply circulate the aqueous medium through a filter and thereby remove any precipitated ammonium chloride by such a process.

After the hydrolysis has been completed it is desirable to separate the silanol product from the aqueous phase as rapidly as possible. Since the silanol is lighter than water it is merely a matter of separating the two liquid phases. If desired, the silanol so produced can be stored over a material such as sodium bicarbonate which will tend to absorb water dissolved in the silanol.

For the purpose of this invention R can be any monovalent hydrocarbon radical of from 1 to 3 carbon atoms, such as methyl, ethyl, vinyl, allyl or propyl and it can also be the trifluoropropyl or a phenyl radical. If one wishes to prepare a single silanol then the substituent organic groups on the chlorosilane and the silazane are the same. However, one can, if desired, prepare a mixture of two or more silanols by using a mixture of chlorosilanes or of silazanes, or one can employ a chlorosilane having different substituent groups from the silazane used.

Silanols produced by the present invention range in purity up to 90% or more and they can be stored for a year or more without appreciable condensation of the silanol to the corresponding siloxane.

The silanols produced by the method of this invention can be employed in many applications for which silanols are generally employed. For example, they are water-repelling agents and they can also be employed to treat siliceous surfaces in order to modify them. The silanols can also be employed as endblockers in the preparation of endblocked diorganopolysiloxane fluids.

The following examples are illustrative only and should not be construed as limiting the invention which is properly delineated in the appended claims.

EXAMPLE 1

25 ml. of a mixture of trimethylchlorosilane and hexamethyldisilazane in a mol ratio of 0.8:1 was added with rapid stirring to a solution of 36 g. of sodium bicarbonate in 300 ml. of water. The addition took place over a period of 546 seconds and the pH of the aqueous phase varied from an initial value of 8.1 to 8.2 throughout the process. The temperature during the addition ranged from 21 to 24° C. The mixture was allowed to stand for an additional 211 seconds, whereupon the pH of the aqueous phase rose to 8.41. The mixture was then separated into the two phases and the organosilicon phase was shown by gas liquid chromatography to be 92% pure trimethylsilanol.

By way of comparison trimethylchlorosilane was added to the same sodium bicarbonate solution in amount of 19.5 ml. over a period of 570 seconds. The pH of the solution dropped from 8.02 initial to 5.5 at the end of the addition. This addition was carried out at a temperature of between 21 and 24° C. The siloxane phase was separated from the aqueous phase and analysis by gas liquid chromatography showed that there was only 7 to 8% silanol in the organosilicon phase.

EXAMPLE 2

370 ml. of a mixture of vinyldimethylchlorosilane and symmetrical tetramethyldivinyldisilazane in the molar ratio of .86 to 1 was added at the rate of 25 ml. per minute to 1500 ml. of water containing 240 g. of sodium acetate. The mixture was stirred rapidly during the addition. The temperature during the hydrolysis ranged from 32 to 36° C. After completion of the hydrolysis the organosilicon phase was separated from the aqueous phase and analyzed by vapor phase chromatography showed that the product contained 95.2% vinyldimethylsilanol and only 4.6% symmetrical tetramethyldivinyldisiloxane. The silanol was stable on storage.

EXAMPLE 3

A mixture of 8.13 g. of bis-3,3,3-trifluoropropyltetramethyldisilazane and 4.09 g. of 3,3,3-trifluoropropyldimethylchlorosilane (molar ratio 0.89:1) was added with agitation to a solution of 14 g. of sodium acetate in a 150 ml. of water. The temperature during the reaction was 30° C. After addition was complete the product settled to the bottom of the vessel, so 10 ml. of diethylether was added and the organosilicon phase then rose to the top. The product was decanted from the aqueous phase and stripped to give a product containing 84%, 3,3,3-trifluoropropyldimethylsilanol and 4% of symmetrical bis-3,3,3-trifluoropropyltetramethyldisiloxane. The product contained 12% unreacted disilazane. This indicates that a preferred reaction temperature would have been above 30° C. and the preferred ratio of chlorosilanes and silazanes should have been between .9 to 1.

EXAMPLE 4

50 g. of an equimolar mixture of trimethylchlorosilane and hexa-methyldisilazane was added with stirring to 200 ml. of water containing 30 g. of ammonium acetate. The silane mixture was added slowly to the water at room temperature. The pH of the aqueous medium was 6.5 and the percent yield of trimethylsilanol was 73%.

EXAMPLE 5

A mixture of 330 g. of trimethylchlorosilanes and 630 g. of hexa-methyldisilazane (molar ratio .78 to 1), was fed continuously at a rate of 7 ml. per minute into a vessel into which a saturated aqueous solution of sodium bicarbonate was fed at the rate of 60 ml. per minute. The hydrolysis was carried out at 25° C. and after separation of the organosilicon phase the yield of trimethylsilanol was 88.2%. There was rapid agitation of the hydrolysis medium during addition of the silanes.

EXAMPLE 6

Equivalent results are obtained when a mixture of diethylmethylchlorosilane and sym-dimethyltetraethyldisilazane; a mixture of allyldimethylchlorosilane and sym-diallyltetramethyldisilazane; or a mixture of phenyldimethylchlorosilane and sym-diphenyltetramethyldisilazane are each employed in the procedure of Example 2.

That which is claimed is:

1. A method of producing silanols of the formula $R_3SiOH$ which comprises (1) adding a mixture of

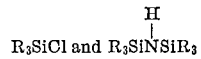

in the molar ratio of .75:1 to 1:1 to water containing dissolved therein, a salt of an alkali metal or ammonia in amount to impart a pH of between 6 to 9 to the aqueous phase, the reaction mixture being thoroughly agitated during addition of the reactants, and (2) thereafter separating the $R_3SiOH$ so-produced from the aqueous phase, in said compounds R being of the group consisting of aliphatic hydrocarbon radicals of from 1 to 3 carbon atoms, the phenyl radical and the $CF_3CH_2CH_2$— radical, there being on the average of no more than one phenyl or trifluoropropyl radical per silicon atom.

2. The process in accordance with claim 1 in which each R is a methyl radical.

3. The process in accordance with claim 1 in which the mixture is that of vinyldimethylchlorosilane and symmetrical divinyltetramethyldisilazane.

4. The method in accordance with claim 1 in which the chlorosilane is 3,3,3-trifluoropropyldimethylchlorosilane and the silazane is symmetrical bis-3,3,3-trifluoropropyltetramethyldisilazane.

5. The method in accordance with claim 1 in which the chlorosilane is phenyldimethylchlorosilane and the silazane is sym-diphenyltetramethyldisilazane.

References Cited

UNITED STATES PATENTS

| | | |
|---|---|---|
| 2,899,453 | 8/1959 | Spector et al. |
| 3,258,444 | 6/1966 | Santelli. |
| 3,328,448 | 6/1967 | Barnes et al. |
| 3,378,575 | 4/1968 | Brown. |
| 3,398,179 | 8/1968 | Flatt. |
| 3,405,155 | 10/1968 | Natoli. |

TOBIAS E. LEVOW, Primary Examiner

P. F. SHAVER, Assistant Examiner